United States Patent
Garbe-Schoenberg et al.

(10) Patent No.: US 11,656,158 B2
(45) Date of Patent: May 23, 2023

(54) PRODUCTION OF NANOPARTICULATE COMPRESSED TABLETS (PELLETS) FROM SYNTHETIC OR NATURAL MATERIALS USING A SPECIALLY DEVELOPED GRINDING AND COMPRESSING METHOD

(71) Applicant: Christian-Albrechts-Universitaet zu Kiel, Kiel (DE)

(72) Inventors: Carl-Dieter Garbe-Schoenberg, Achterwehr (DE); Samuel Mueller, Kiel (DE); Simon Nordstad, Kiel (DE)

(73) Assignee: Christian-Albrechts-Universitaet zu Kiel, Kiel (DE)

( * ) Notice: Subject to any disclaimer, the term of this patent is extended or adjusted under 35 U.S.C. 154(b) by 579 days.

(21) Appl. No.: 16/619,501

(22) PCT Filed: Jun. 5, 2018

(86) PCT No.: PCT/DE2018/100533
§ 371 (c)(1),
(2) Date: Dec. 5, 2019

(87) PCT Pub. No.: WO2018/224092
PCT Pub. Date: Dec. 13, 2018

(65) Prior Publication Data
US 2020/0140341 A1 May 7, 2020

(30) Foreign Application Priority Data
Jun. 8, 2017 (DE) .............. 10 2017 112 691.0

(51) Int. Cl.
*C04B 35/626* (2006.01)
*G01N 1/28* (2006.01)

(52) U.S. Cl.
CPC ....... *C04B 35/62695* (2013.01); *G01N 1/286* (2013.01); *G01N 2001/2866* (2013.01); *G01N 2001/2893* (2013.01)

(58) Field of Classification Search
CPC .............. B02C 19/06; B02C 23/18; Y10T 428/2892; C01P 2004/64
See application file for complete search history.

(56) References Cited

U.S. PATENT DOCUMENTS
2008/0135798 A1 6/2008 Jeon et al.

FOREIGN PATENT DOCUMENTS
EP 1621526 A1 2/2006
WO 2004077521 A2 9/2004
WO 2006024098 A1 3/2006

OTHER PUBLICATIONS

Bao et al., Development of pressed sulfide powder tablets for in situ sulfur and lead isotope measurement using LA-MC-ICP-MS, International Journal of Mass Spectrometry 421 (2017) 255-262 (Year: 2017).*

(Continued)

*Primary Examiner* — Hoa (Holly) Le
(74) *Attorney, Agent, or Firm* — Patent Central LLC; Stephan A. Pendorf

(57) ABSTRACT

A method for producing nanoparticulate compressed tablets/pellets from synthetic and/or natural materials, and compressed tablets/pellets produced using the method for producing nanoparticulate compressed tablets/pellets from synthetic and/or natural materials and to uses thereof.

7 Claims, 1 Drawing Sheet

(56) References Cited

OTHER PUBLICATIONS

Figure 1:
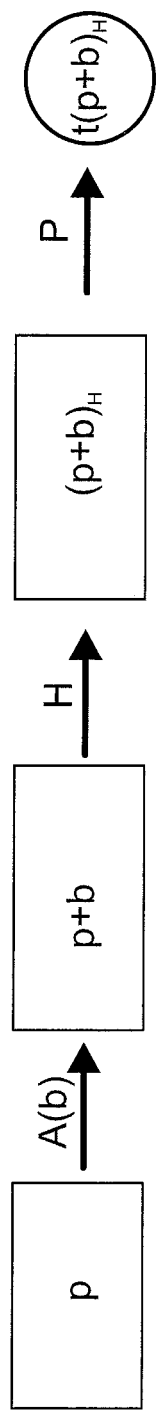

International Search Report dated Oct. 5, 2018, in International Application No. PCT/DE2018/100533.
Aurelie Cardin: "High trhoughput method for the development of bulk lead free piezoelectric ceramics", Jun. 24, 2009 (Jun. 24, 2009), Retrieved from the Internet: https://scidok.sulb.uni-saarland.de/bitstream/20.500.11880/22639/1/dissACardin_210609.pdf (retrieved on Sep. 25, 2018), DOI: 10.22028/D291-22583 XP055509903, pp. 32-42; figure 12, p. 120-p. 124; figure 84; table 12, pp. 132-136; figure 95.
Dieter Garbe-Schoenberg et al. "Nano-particulate powder tablets for LAICP-MS", Journal of Analytical Atomic Spectrometry, vol. 39, No. 6, Jan. 1, 2014 (Jan. 1, 2014), pp. 990-1000, DOI: 10.1039/C4JA00007B, ISSN: 0267-9477, XP055509904, 2. Experimental; figure 1, 3. Results and Discussion; figure 2.

\* cited by examiner

PRODUCTION OF NANOPARTICULATE COMPRESSED TABLETS (PELLETS) FROM SYNTHETIC OR NATURAL MATERIALS USING A SPECIALLY DEVELOPED GRINDING AND COMPRESSING METHOD

The invention relates to a compressed tablet/pellet producing method for nanoparticulate compressed tablets/pellets from synthetic and/or natural materials comprising the steps of:
producing an analytically finely ground powder with grain size<75 µm,
and
compressing at least an aliquot thereof into a tablet/pellet in a high pressure press.

Furthermore, the invention relates to a pressed tablet or a pellet and uses thereof.

In addition to mobile X-ray scanners, micro-analytical methods for element concentration determinations directly on solids are becoming more and more universally applicable and are widely used, e.g. in research, for the quality assurance of materials or for exploration in the mining industry.

There are however virtually no materials having sufficient homogeneity to be suitable as standards to so that the appropriate analysis method can be calibrated and measurement results validated.

On a micrometer scale, homogeneous natural materials, such as crystals, are extremely rare or very difficult to produce. Homogeneous synthetic glasses can only be produced with difficulty, and not from all substances. Powdered pressed tablets, also referred to as pellets in the past, were previously too coarse for microanalysis and mostly contained a binder.

From the prior art, a production process for corresponding pellets is known, which the publication/document "Nanoparticulate pressed powder tablets for LA-ICP-MS" by D. Garbe-Schönberg and S. Muller published on Apr. 16, 2014 in The Royal Society of Chemistry, J. Anal. At. Spectrom, 2014, 29, 990. The prior art from this publication is explicitly included in this document.

In the following, the problems of the prior art are briefly listed, which are processed herein and which are solved with the present disclosure, namely:

Problem of Analytical Chemistry:
For the calibration and validation of microanalyses directly on solids, standard reference materials (SRM) are needed, whose properties should be as similar as possible to those of the unknown samples (matrix matching).

These SRMs must be as homogeneous at any point that microanalysis with e.g. 1 µm to 100 µm spatial resolution always yield the same result within a given confidence interval, and the same goes for trace and ultra-trace elements, which is however extremely difficult, expensive and complex, to find such homogeneous materials in nature or produce them technically.

Until now there have been used as SRM natural or synthetic glasses, natural or synthetic minerals, metals or metal alloys, powder pressed tablets of natural or synthetic substances or mixtures of substances.

Glass:
Many materials cannot be melted and processed into a homogeneous glass. When melting, volatiles are lost from the original material. Glasses have different properties than, for example, crystalline materials. There are very few natural homogeneous glasses.

Metals:
Diffusion within the metal results in heterogeneity in the manufacture.

Minerals:
Over larger ranges (mm-cm scale) sufficiently homogeneous natural minerals in required larger quantities (>300-500 g) occur very rarely.

In the manufacture/culturing of synthetic minerals heterogeneity arises, and it is very difficult to produce crystals which over larger ranges have the necessary homogeneity.

Powder Pressed Tablets:
Stable pressed tablets made of powders have so far been produced only with the addition of binders.

The grain sizes of the particles in the range 10-100 µm from "normal" analysis finely ground powders are much too coarse, and thus unsuitable for micro-analyses with spatial resolution of 1 to 100 µm. Nanoparticle compacts produced using the bottom-up (SdT) principle are extremely expensive, and material matching to natural materials with a complex composition (50+ elements) is hardly possible.

The object of the invention is to demonstrate new possibilities for producing homogeneous standards for a variety of materials.

Compressed tablets/pellets of synthetic or natural materials are to be produce on the basis of a newly developed grinding and pressing method.

These tasks are solved with the relevant combination of features according to the main claim and according to the dependent claims.

The compressed tablet/pellet producing method for nanoparticulate compressed tablets/pellets from synthetic and/or natural materials comprises the steps of:
producing an analytically finely ground powder with grain size<75 µm,
and
compressing at least an aliquot thereof into a tablet/pellet in a high pressure press,
wherein between the above-mentioned steps
first a wet grinding of fine-ground powder is carried out in a grinding arrangement, jet-mill grinding arrangement and/or high-energy ball mill grinding arrangement to produce a ground material;
subsequently, a transferring and drying, thermal drying or freeze-drying of the ground material to a nanopowder occurs
and
then a re-homogenizing of the dried nanopowder takes place,
wherein
the at least one aliquot for pressing of the dried and re-homogenized nanopowder is selected,
compressing takes place without addition of binder,
and
a nanoparticulate powder with grain sizes D90<1 µm is formed.

Nanoparticles are produced with this "top-down" principle, which can be pressed into stable tablets without need for addition of binders.

The very small particle sizes ensure excellent homogeneity down to the micrometer range.

Low porosity and excellent surface quality of the tablets allow their measurement even with electron or ion beam measurement in high vacuum.

The nano-tablets also offer better properties for measurements with X-ray fluorescence (X-ray scanner) than previously used powder compacts. This makes the tablets a new universal material that can be studied using a variety of micro-analysis techniques and therefore has great potential for being a certifiable standard reference material for both elemental and isotopic compositions.

The present manufacturing process includes an ultra-fine grinding, also performed under the term "top-down" principle, to nanoparticles, followed by freeze-drying, and the compression of the nanopowder s in particular with stylus or sapphire disks in a preferably programmable high-pressure press.

An optional and preferred strengthening of the tablets externally (edge, back) with pressing aids such as cellulose, boric acid (sandwich) is possible and useful.

The present process enables the preparation of stable, compressed tablets (pellets) made of synthetic and/or natural materials, which are transformed into nanoparticles, according to the top-down principle, whereby also very complex composite materials can be transformed.

In a particularly preferred embodiment, the nanoparticulate powder is formed with particle sizes of 30-150 nm with D90<1 μm.

The extremely small particle size allows a very good homogenization of substances e.g. substance mixtures (10-100 μm scale).

Compared with the state of the art, for example the art cited in Garbe-Schönberg and Müller, 2014 (see Introduction to the SdT), the present process, by continuous improvement of the state of the art, is today better in the particle size and surface quality of the tablets by two orders of magnitude.

Significant changes to the prior art exist in the type of grinder used, the grinding protocol, and in a fundamental change in the pressing process in the production of tablets.

The pressing of the aliquot is preferably carried out in a high-pressure press in the working range of 2 to 80 t, 3 to 40 or in particular 5 to 20 t.

Furthermore, pressing in the high-pressure press with polished sapphire, glass and e.g. or diamond disks form-fit adapted to the range of application may preferably be effected by pressing tools.

To avoid contamination of the tablet surface by the metallic press-die and to achieve a smooth and level surface a sapphire disk can be placed between the powder and press-die.

In particular, the wet grinding may be done with a liquid, wherein the liquid may be water, de-ionized water and/or an organic solvent.

With regard to the grinding protocols, the essential parameters that vary depending on the material are the amount of water and the grinding time, with other parameters such as speed of rotation (acceleration) etc. also possibly being varied. As an example, the following grinding protocols for geological/environmental materials are listed:

ores, fly ash: 30 min, 10 ml D.I. water
basalt (mafic rocks): 45 min, 5 ml D.I. water
carbonate/phosphate: 15 min, 10 ml D.I. water
granite, etc.: 60 min, 5 ml D.I. water
ultramafic rocks: 45 min, 5 ml D.I. water The compressed tablets/pellets, prepared according to one of the foregoing compressed tablet/pellet producing methods for nanoparticulate compressed tablets/pellets from synthetic and/or natural materials, are likewise worthy of protection.

Furthermore, also the use of the foregoing compressed tablets/pellets, prepared with one of the foregoing compressed tablet/pellet producing methods for nanoparticulate compressed tablets/pellets from synthetic and/or natural materials, is particularly advantageous as reference material, in particular when certified according to ISO standards, for solids analysis methods.

Further, the foregoing compressed tablets/pellets, prepared by any of the foregoing compressed tablet/pellet producing methods for nanoparticulate compressed tablets/pellets from synthetic and/or natural materials, can be used as a medium for direct solid analysis.

The perspective of this development is that in the future no longer is there a need for a wet lab for the dissociation of solids, since this type of wet laboratories with are associated with considerable effort for purity and high risks from hazardous substances.

Overall, there are the following advantages:

in order to form mechanically stable tablets of undiluted original powder, due to the very high cohesion of the nanoparticles no addition of binder is necessary any longer, and accordingly no dilution e.g. material change of the original material occurs;

due to the extremely small particle size of the nanoparticles<100 nm, there is a very low heterogeneity in analyses with spatial resolution in the range of 1-100 μm;

it is the ideal opportunity to homogenize natural or synthetic materials;

mixing and homogenization of different solids is possible;

the stability in a high vacuum and under high-energy radiation (electron beam, ion beam) is given;

the surface is extremely flat and smooth (roughness<30-150 nm); compacts are ultra-homogeneous, stable and have an extremely smooth and even surface;

extremely homogeneous solids, also manufactured according to ISO and REMCO guidelines, suitable as certified standard reference materials (SRM) for a variety of materials for elemental and isotopic composition;

addresses the world's extreme lack of homogeneous solids, which can be used as a micro-SRM;

is suitable for many micro-analysis methods with X-ray, laser, electron and ion beams, the very big problem of the worldwide lack of homogeneous SRM is thereby solved;

self contained analysis methods for the elemental analysis of solids on the basically to ultra pure trace element compositions are possible, wherein wet laboratories with hazardous materials can be dispensed with;

dispensing with addition of grinding or pressing aids;

homogeneous mixture of different materials as nanopowder without phase separation.

Subsequently an embodiment of the invention will be described in detail in the description of the figures with reference to the accompanying drawings, which is intended to illustrate the invention and not to be considered limiting. In addition, the prior art will be explained.

Figure 2:
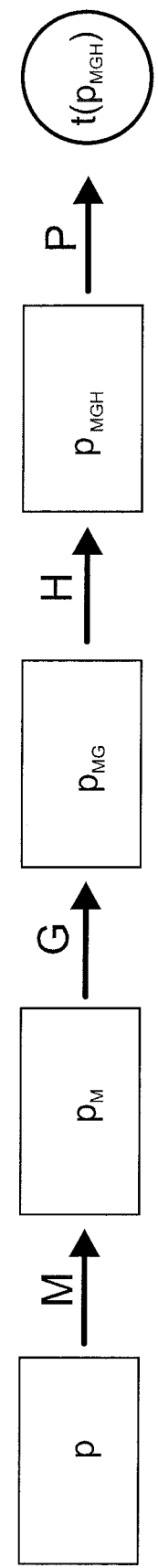

There is shown in:

FIG. 1 a schematic representation of an embodiment of the manufacturing method known in the prior art and FIG. 2 a schematic representation of an embodiment of the manufacturing method disclosed herein.

In FIG. 1 a schematic representation of an embodiment of the manufacturing method known in the prior art is shown.

In this case, the starting material p is first of all finely ground (<75 μm) and subsequently mixed A(b) with a binder b, for example cellulose, wax, boric acid, organic compounds, etc. and homogenized H. Subsequently, an aliquot thereof $(p+b)_H$ is pressed P in a high pressure hydraulic press at 5 to 20 t to form a tablet or pellet $t(p+b)_H$.

FIG. 2 shows a schematic representation of an embodiment of the manufacturing method disclosed herein.

In a first step, 3-4 g of finely ground powder p of the original material are weighed in a grinding cup, for example made of agate, under a so-called clean bench in a particle-free atmosphere.

The grinding cup already contains a certain amount of grinding balls made of agate, whereby diameter and total mass of the balls depends on the material (grinding protocol).

Grinding balls and cups had previously been cleaned by grinding of high purity (optical grade) quartz powder. There follows an addition of de-ionized water (DIW, >18.2 MOhm), wherein the amount depends on the material to be ground (grinding protocol) and is such that during grinding a suspension with oil-like viscosity is formed. Subsequently, the grinding cup is sealed and inserted in a ball grinder.

This is followed by a wet grinding M in a high-energy ball grinder in interval operation.

The grinding time is material-specific and has been optimized for a number of materials (grinding protocol). This produces particles with particle sizes in the nanometer range (30-150 nm, $D_{90}<1$ µm).

The ready-ground nanopowder $p_M$ is rinsed from the balls and the grinding bowl with DIW as a suspension and transferred with a pipette into a pre-cleaned plastic cup. The plastic cup with the suspension (about 50-100 ml) is snap frozen at −80° C. and then dried in a freeze dryer G over 72-96 h.

The dried nanopowder $p_{MG\;H}$ is transferred into a hand-mortar made of agate and re-homogenized H.

The re-homogenized nanopowder $p_{MG\;H}$ is weighed in the pressing tool (about 600 mg for a tablet of 13 mm diameter), then this is placed in a programmable hydraulic tablet press and then the powder is compressed P with 10 t/cm² (for 13 mm diameter; press protocol) for 1 minute.

In order to avoid contamination of the tablet surface by the metallic pressing punch and to achieve a very smooth and even surface, a sapphire disc is placed between powder $p_{MG}$ and punch. Depending on the analytical application, tablets t ($p_{MGH}$ with different diameters (e.g. 5, 10, 13, 32 mm) are produced.

LIST OF REFERENCE NUMBERS

A addition of a binder b
B binder
G freeze drying
H rehomogenizing
M grinding process e.g. wet grinding
P pressing
P powder, analytically finely ground
$p_M$ powder, ground
$p_{MG}$ nanopowder e.g. powder, ground and freeze-dried
$p_{MGH}$ homogenized nanopowder e.g. powder, ground, freeze-dried and re-homogenized
p+b powder with binder
$(p+b)_H$ powder with binder, homogenized
t pellet, tablet

The invention claimed is:

1. A method for producing nanoparticulate compressed tablets/pellets from synthetic and/or natural materials comprising the steps of:
   producing a fine-ground powder (p) with grain size<75 µm,
   wet grinding (M) the fine-ground powder (p) in a grinding arrangement, jet-mill grinding arrangement and/or high-energy ball mill grinding arrangement to produce a ground material ($p_M$) with a particle size in the range of 30-150 nm and with a $D_{90}<1$ µm;
   transfering and drying, thermal drying or freeze-drying (G) the ground material ($p_M$) to produce a dried nanopowder ($p_{MG}$);
   re-homogenizing (R) the dried nanopowder ($p_{MG}$) to produce a dried and re-homogenized nanopowder ($p_{MGR}$), and
   pressing (P) at least an aliquot of dried and re-homogenized nanopowder ($p_{MGR}$) into a tablet/pellet (t) in a high pressure press in the working range of 2 to 80 tons without addition of binder.

2. A method for producing nanoparticulate compressed tablets/pellets according to claim 1,
   wherein
   the pressing (P) in the high pressure press occurs with a polished sapphire, glass and/or diamond disk between a pressing tool and the aliquot of dried and re-homogenized nanopowder ($p_{MGR}$) and wherein the pressing tool is shaped according to the area of application.

3. A method for producing nanoparticulate compressed tablets/pellets according to claim 1,
   wherein
   the wet grinding (M) is carried out with a liquid, wherein the liquid is water and/or an organic solvent.

4. A method for producing nanoparticulate compressed tablets/pellets according to claim 1, wherein the pressing (P) of the aliquot of dried and re-homogenized nanopowder ($p_{MGR}$) takes place in a high pressure press in the working range of 3 to 40 tons.

5. A method for producing nanoparticulate compressed tablets/pellets according to claim 1, wherein the pressing (P) of the aliquot of dried and re-homogenized nanopowder ($p_{MGR}$) takes place in a high pressure press in the working range of 5-20 tons.

6. Compressed tablets/pellets made by the method of claim 1.

7. A method for calibration of equipment for solid-state analysis, the method comprising first using a compressed tablet/pellet produced according to claim 1 as a reference material for the equipment for solid-state analysis or as a medium for direct solid-state analysis.

* * * * *